(12) United States Patent
Brown

(10) Patent No.: US 8,591,122 B2
(45) Date of Patent: Nov. 26, 2013

(54) AXIAL BEARING ARRANGEMENT AND METHOD FOR MANUFACTURING SAME

(75) Inventor: James Kevin Brown, Rock Hill, SC (US)

(73) Assignee: Schaeffler Technologies AG & Co. KG, Herzogenaurach (DE)

(\*) Notice: Subject to any disclaimer, the term of this patent is extended or adjusted under 35 U.S.C. 154(b) by 293 days.

(21) Appl. No.: 12/840,855

(22) Filed: Jul. 21, 2010

(65) Prior Publication Data

US 2011/0019954 A1 Jan. 27, 2011

Related U.S. Application Data

(60) Provisional application No. 61/227,592, filed on Jul. 22, 2009.

(51) Int. Cl.
*F16C 19/30* (2006.01)
*F16C 43/04* (2006.01)

(52) U.S. Cl.
USPC .......................................... 384/618; 384/620

(58) Field of Classification Search
USPC ......... 384/513, 560, 564, 565, 584, 585, 590, 384/600, 618, 619, 620, 621, 622, 623
See application file for complete search history.

(56) References Cited

U.S. PATENT DOCUMENTS

| | | | | |
|---|---|---|---|---|
| RE34,813 E | \* | 12/1994 | Gardella | 384/620 |
| 5,470,165 A | \* | 11/1995 | Bissinger | 403/313 |
| 5,474,390 A | \* | 12/1995 | Rhoads | 384/623 |
| 5,927,868 A | \* | 7/1999 | Critchley et al. | 384/606 |
| 6,520,685 B1 | \* | 2/2003 | Urmaza | 384/620 |
| 6,905,250 B2 | \* | 6/2005 | Lynch et al. | 384/621 |
| 7,104,699 B2 | \* | 9/2006 | Shattuck et al. | 384/621 |
| 7,775,724 B2 | \* | 8/2010 | Brown et al. | 384/597 |
| 7,896,558 B2 | \* | 3/2011 | Obayashi et al. | 384/623 |
| 2006/0185954 A1 | \* | 8/2006 | Rebholz | 192/3.29 |

FOREIGN PATENT DOCUMENTS

| | | | | |
|---|---|---|---|---|
| DE | 198 57 033 | | | 6/1999 |
| DE | 10 2007 053 974 | | | 6/2008 |
| JP | 2003301848 | A | \* | 10/2003 |
| JP | 2004028227 | A | \* | 1/2004 |
| JP | 2004176781 | A | \* | 6/2004 |
| JP | 2007205484 | A | \* | 8/2007 |

\* cited by examiner

*Primary Examiner* — Thomas R Hannon
*Assistant Examiner* — Adam D Rogers
(74) *Attorney, Agent, or Firm* — Lucas & Mercanti, LLP

(57) ABSTRACT

An axial bearing arrangement includes a first bearing ring forming a structural unit with a radially inwardly directed axial projection with a radially outwardly directed resilient element and a first running surface, a second bearing ring with a radially outwardly arranged axial projection with a radially inwardly directed resilient element and a second running surface, and a single-piece rolling body cage which receives distributed over the circumference rolling bodies which roll on the running surfaces wherein the rolling body cage radially engages over the two resilient elements.

8 Claims, 1 Drawing Sheet

AXIAL BEARING ARRANGEMENT AND METHOD FOR MANUFACTURING SAME

This application claims the priority of U.S. 61/227,592 filed Jul. 22, 2009, which is incorporated by reference herein.

FIELD OF THE INVENTION

The invention relates to a axial bearing arrangement with a first bearing ring forming a structural unit with a radially inwardly arranged axial projection with a radially outwardly directed resilient element and a first running surface, and a second bearing ring with a radially outwardly arranged axial projection with a radially inwardly directed resilient element with a second running surface and a single part rolling body cage which receives rolling bodies which roll distributed over the circumference on the running surfaces, wherein the cage engages radially over the two resilient elements.

BACKGROUND OF THE INVENTION

An axial bearing arrangement of the generic type is known from DE 198 57 033 A1, wherein the axial bearing arrangement secures as a structural unit the bearing rings and the rolling body cage captively receiving the rolling bodies relative to each other. The bearing rings are constructed so as to be L-shaped in cross-section with a respectively radially outer and a radially inner axial projection, wherein the projections are roller-burnished or beaded after the rolling body cage has been inserted, so that radial resilient elements are formed which axially secure the rolling body cage between the running surfaces for the rolling bodies arranged at the bearing rings and the resilient elements, and thus, the bearing rings and the rolling body cage are held on each other while forming the structural unit of the axial bearing arrangement.

For realizing the resilient elements, material-deforming manufacturing steps are required after positioning of the parts on each other, wherein the manufacturing steps are especially in the manufacture of the bearings in manufacturing robots foreign to the manufacture and thereby expensive and complicated. If the material-deforming steps are omitted, the structural unit can fall apart during the transport or the assembly, for example, for axially supporting two components which are rotatable relative to each other of a hydrodynamic torque converter.

OBJECT OF THE INVENTION

Therefore, the above results in the object of proposing an axial bearing arrangement manufactured as a structural unit with structural components which are arranged captively on each other, and a method for the manufacture thereof, which does not require the additional material-deforming manufacturing steps after positioning of the components of the axial bearing arrangement on each other.

DESCRIPTION OF THE INVENTION

In accordance with the invention, this object is met by an axial bearing arrangement with a first bearing ring forming a structural unit with a radially inwardly arranged axial projection and a radially outwardly directed resilient element and a first running surface, and a second bearing ring with a radially outwardly arranged axial projection with a radially inwardly directed resilient element with a second running surface and a single-part rolling body cage which receives rolling bodies that are distributed over the circumference and roll on the running surfaces, wherein the rolling body cage engages radially over the two resilient elements, and wherein the structural parts forming the structural unit are captively received on each other by means of two retaining rings arranged radially above each other so as to be supported at a contact surface of the rolling body cage and the resilient elements. The retaining rings are advantageously radially slotted. Due to the radial slot, the retaining rings are radially elastically constructed and can, with the appropriate radial pretension, be expanded or diminished beyond the diameter of the resilient elements and pressed over the resilient elements as well as pulled without further manufacturing steps of a material deformation.

In accordance with an advantageous embodiment, the axial bearing arrangement may be equipped with rolling bodies formed of balls or preferably radially oriented needles. The bearing rings have radially constructed running surfaces for the rolling bodies, wherein the running surfaces are essentially parallel to the resilient elements and are axially spaced apart, wherein the retaining rings engage radially over the resilient elements provided at the bearing rings when the bearings rings are un-tensioned. The retaining rings may each be tensioned radially together with the bearing rings. The rolling body is radially outwardly and radially inwardly each expanded relative to the inner circumference of the retaining rings and forms a stop surface each with a retaining ring, so that the two bearing rings are captively arranged over the rolling body bearing on top of each other.

In accordance with an advantageous embodiment, the retaining rings may be radially pre-tensioned relative to the running rings radially outwardly or radially inwardly and may center the running rings, if necessary, on each other. The rolling body cage may have radially inwardly and radially outwardly an annular rim which is folded over axially at least once. This annular rim may have a radial elasticity and may be calibrated relative to its diameter. It has been found advantageous of the annular rim is folded over twice in the axial direction. In this connection, the contact surfaces for the retaining rings are formed at the projection at the end of the annular rim or by an annular bead composed by two annular rim sections which are folded over and located on each other.

It has additionally been found advantageous to construct the retaining rings so as to be L-shaped in cross-section. In this case, it is possible to construct from an annular axially constructed leg a plane contact surface at the inner circumference of the bearing ring between resilient element and running surface, and from a radially oriented annular leg can be provided a contact surface for the contact surface of the rolling body cage.

The object of the invention is further met by a method for producing an axial bearing arrangement which forms a structural unit, wherein the axial bearing arrangement includes a first bearing ring with a radially inwardly arranged axial projection with a radially outwardly directed resilient element and a first running surface, a second bearing ring with a radially outwardly arranged axial projection with a radially inwardly directed resilient element with a second running surface as well as a single-part rolling body cage which receives rolling bodies which are distributed over the circumference and roll on the rolling surfaces, wherein the rolling body cage radially engages over the two resilient elements, wherein the rolling body cage is placed with the rolling bodies in one of the bearing rings, a first retaining ring is pressed over the first resilient element, the other bearing ring is pulled over the rolling body cage and the structural unit is captively constructed by pressing on a second retaining ring.

The axial bearing arrangement as described above is particularly suitable for two structural components which are rotatable relative to each other and are mounted radially on each other of a hydrodynamic torque converter as it is disclosed, for example, DE 10 2007 053 974 A1. The thrust bearing arrangements according to the invention are used, in this connection, for example, for uncoupling the rotation of the hub flange of the torque vibration damper from the converter bridging coupling or the turbine wheel which rest axially against each other.

BRIEF DESCRIPTION OF THE DRAWINGS

The invention is explained in more detail with the aid of embodiments illustrated in FIGS. 1 to 3. In the drawing.

DETAILED DESCRIPTION OF THE DRAWINGS

Figure 1:
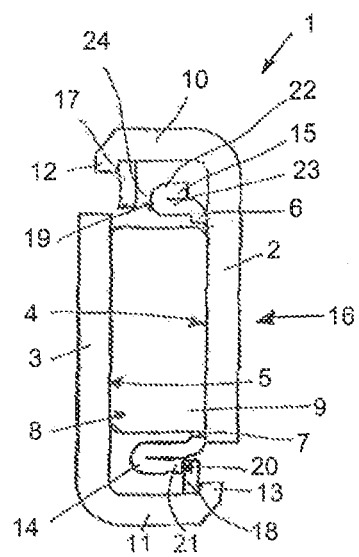
FIG. 1 is a longitudinal section view of an axial bearing arrangement according to the invention.

FIG. 1 shows the upper half of a longitudinal sectional view of the axial bearing arrangement 1 constructed so as to be symmetrical with respect to rotation about an axis of rotation. The two bearing rings 2, 3 are formed of deformed sheet metal parts which have radially oriented running surfaces 4, 5 for the rolling bodies 8 received in the rolling body cage 6 in resilient elements 7 correspondingly provided in the cage 6 spaced apart in circumferential direction, wherein the rolling bodies 8 are in the form of radially aligned needles 9 which are distributed over the circumference of the rolling body cage 6. The bearing rings 2, 3 each have radially inwardly or radially outwardly arranged axial projections 10, 11. on which are already provided radially inwardly or radially outwardly directed off-tool resilient elements 12, 13.

The rolling body cage 6 has on its inner circumference and at its outer circumference an axially multi-folded annular rim 14, 15 each, which is folded twice and has at its axial projection 21, or at the annular bead 24 connecting the two annular ring sections 22, 23, a contact surface 19. Between the contact surfaces 19, 20 and the resilient elements 12, 13, a retaining ring 17, 18 is respectively arranged. These each radially surround the resilient element 12, 13 so that the rolling body cage 6 is retained captively in the bearing rings 2, 3 and these are centered with respect to one another and arranged captively. Here, the outer circumference or inner circumference of the annular rims 14, 15 have radial play with respect to the resilient elements 12, 13, so that the rolling body cage 6 can be inserted into the bearing rings 2,3 without assembly force.

The assembly of the axial bearing arrangement 1 into a captive structural unit 16 takes place by placing the rolling body cage 6 with the rolling bodies 8 into one of the bearing ring, 2, 3 as shown with the insertion of the rolling body cage into bearing ring 2. It is understood that the reverse sequence starting with the bearing ring 3 also is included in the scope of the inventive concept. After placing the rolling body cage 6 into the bearing ring 2, the preferably radially slotted corresponding retaining ring 17 is reduced by elastic pre-tensioning to the diameter of the resilient element 12 and is arranged axially between the resilient element 12 and the contact surface 19 of the annular rim 15. Subsequently, the bearing ring 3 is placed against the rolling bodies 8 and the elastically pre-tensioned retaining ring 18, which is also radially slotted, is lifted over the resilient element 13 so that all components of the structural unit 16 are captively arranged on each other.

Figure 2:
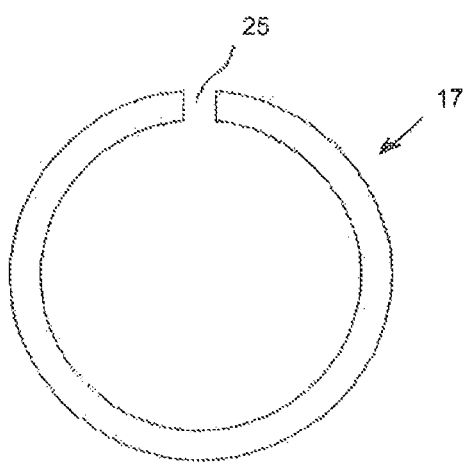
FIG. 2 is a view of a slotted retaining.

FIG. 2 shows the retaining ring 17 of the FIG. 1 in a top view. The retaining ring 18 of FIG. 1 is an identical part. The retaining ring 17 has a slot 25 which permits an elastic reduction of the diameter of the retaining ring 17. For simplification of the pretension, the retaining ring 17 can have means such as openings or projections for an assembly tool which are not shown here.

Figure 3:
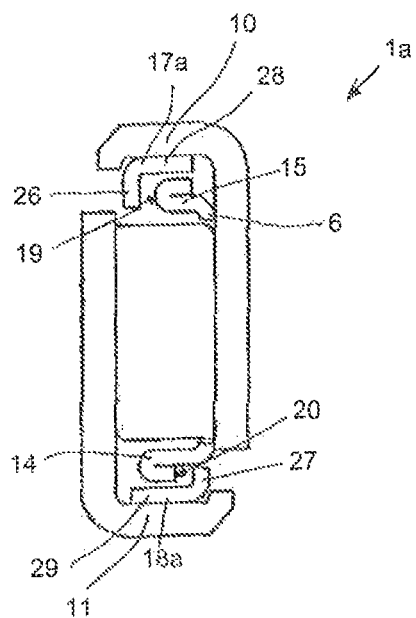
FIG. 3 is a longitudinal sectional view of a axial bearing arrangement similar to the axial bearing arrangement of FIG. 1.

FIG. 3 shows a axial bearing arrangement 1a in a partial view which is similar to the axial bearing arrangement 1 of FIG. 1. In contrast to the axial bearing arrangement 1, the retaining ring 17a, 18a are formed with a L-shaped cross-section with a radially directed leg 26, 27 and an axially directed leg 28, 29. In this case, the radially aligned legs each form a stop surface for the contact surfaces 19, 20 of the annular rims 14, 15 of the rolling body cage 6 and the axial legs 28, 29 have a widened contact surface at the inner circumference of the axial projections.

The invention claimed is:

1. An axial bearing arrangement forming a structural unit, comprising:
   a first bearing ring and a second bearing ring rotatable relative to each other about an axis of rotation of the axial bearing arrangement extending in an axial direction:
   the first bearing ring having a radially inwardly arranged axial projection with a radially outwardly directed resilient element and a first running surface,
   the second bearing ring having a radially outwardly arranged axial projection with a radially inwardly directed resilient element with a second running surface,
   a single-part rolling body cage with rolling bodies which are distributed over a circumference of the rolling body cage and are received by the rolling body cage, wherein the rolling body cage radially engages over the two resilient elements, the rolling body cage having a first axially facing contact face facing the resilient element of the first bearing ring and a second axially facing contact face facing the resilient element of the second bearing ring, and element of the second bearing ring, and
   a first retaining ring disposed axially between the first axially-facing contact face and the resilient element of the first bearing ring, and
   a second retaining ring disposed axially between the second axially-facing contact face and the resilient element of the second bearing ring,
   wherein the first bearing ring, the second bearing ring, and the rolling body cage forming the structural unit are captively secured on one another by the first retaining ring the second retaining ring.

2. The axial bearing arrangement according to claim 1, wherein the first retaining ring and the second retaining ring are radially slotted.

3. The axial bearing arrangement according to claim 1, wherein the rolling bodies are radially aligned needles.

4. The axial bearing arrangement according to claim 1, wherein the rolling body cage has radially inwardly and radially outwardly an annular rim which is axially folded at least once, wherein the annular rims form the first axially-facing contact face and the second axially-facing contact face of the rolling body cage.

5. The axial bearing arrangement according to claim 1, wherein the rolling body cage is tensioned radially outwardly and/or radially inwardly with the first bearing ring and the second bearing ring.

6. The axial bearing arrangement according to claim 1, wherein the first retaining ring and the second retaining ring are constructed with an L-shaped cross-section.

7. The axial bearing arrangement according to claim 1, wherein the axial bearing is configured for two structural components of a hydrodynamic torque converter that can be rotated with respect to one another and mounted axially on each other.

8. The axial bearing arrangement according to claim 1, wherein each of the first retaining ring and the second retaining ring is dimensioned and arranged such that each of the first retaining ring and the second retaining ring is insertable into a respective one of the first bearing ring and the second bearing ring when the rolling body cage is disposed in the respective one of the first and second bearing rings.

* * * * *